United States Patent [19]
Scott

[11] Patent Number: 4,754,295
[45] Date of Patent: Jun. 28, 1988

[54] CAMERA FLASH ATTACHMENT SWITCH

[76] Inventor: T. D. Scott, P.O. Box 328, Ladson, S.C. 29456

[21] Appl. No.: 841,622

[22] Filed: Mar. 20, 1986

[51] Int. Cl.⁴ .................... G03B 15/02; G03B 17/56
[52] U.S. Cl. .................................... 354/129; 354/293
[58] Field of Search ............... 354/266, 288, 354, 293, 354/294, 113, 132, 133, 145.1, 81, 82, 126, 129

[56] References Cited

U.S. PATENT DOCUMENTS

| | | | |
|---|---|---|---|
| 2,358,796 | 9/1944 | Edgerton | 354/129 |
| 3,263,583 | 8/1966 | Schmidt | 354/129 X |
| 4,272,177 | 6/1981 | Ottenheimer | 354/293 |
| 4,488,794 | 12/1984 | Dolgow et al. | 354/293 X |

FOREIGN PATENT DOCUMENTS 2103379 2/1983 United Kingdom ................ 354/294

Primary Examiner—Donald A. Griffin

[57] ABSTRACT

A camera flash attachment switch comprising two or more push on/push off switches, one terminal of each of which is connected to the positive conductor of a standard synchronization cord. The other terminal of all except one of the switches is connected to the remaining terminal of the next switch and the other terminal of the remaining switch is connected to a positive terminal for a standard flash synchronization fitting. Such connections are made with insulated electrical wires. The standard flash synchronization fitting also has a negative terminal to which are connected the negative conductors for each of the standard synchronization cords. The entire assembly is enclosed with a switch box comprising a top and a bottom, which is then bolted to a camera frame or other appropriate holding device.

3 Claims, 2 Drawing Sheets

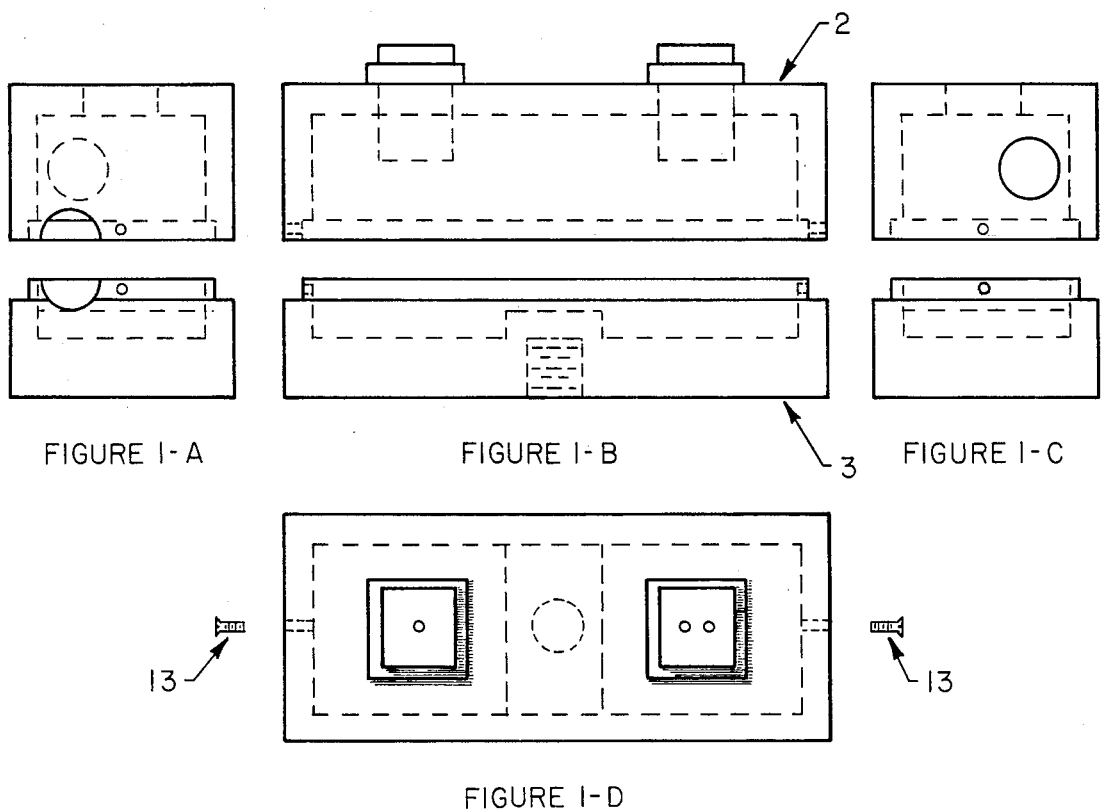
FIGURE 1-A   FIGURE 1-B   FIGURE 1-C
FIGURE 1-D
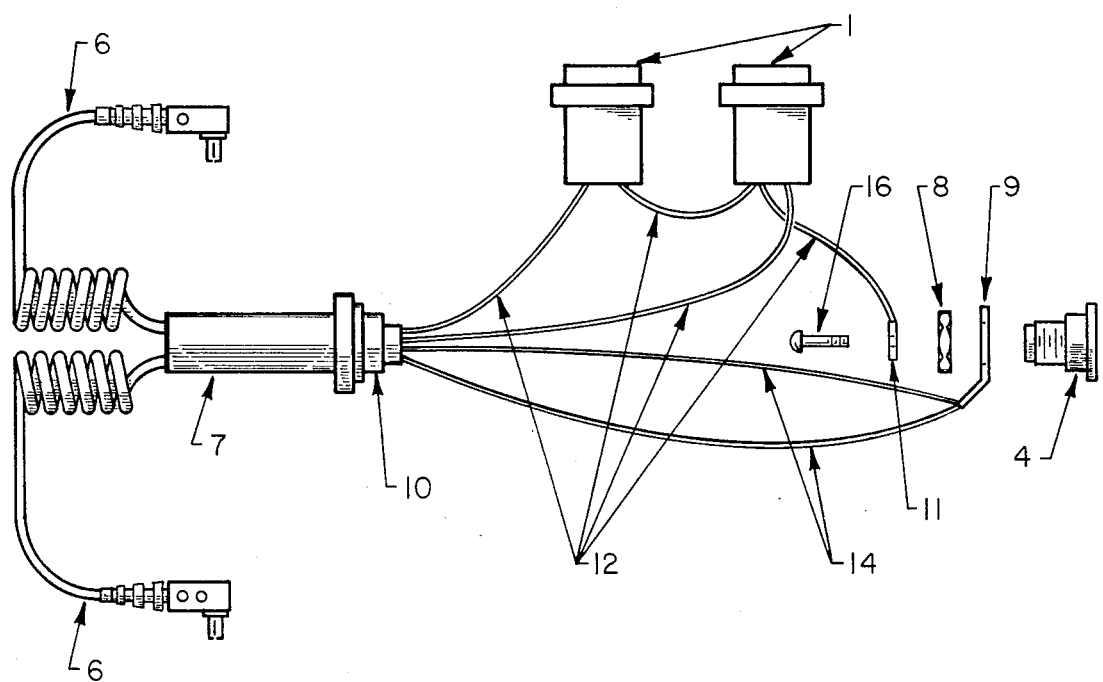
FIGURE 2

CAMERA FLASH ATTACHMENT SWITCH

FIELD OF THE INVENTION

The present invention relates to a device for a camera flash attachment switch which allows for use of one flash attachment with two camera mounted upon a frame in such a manner that photographs may be taken in rapid succession from either camera.

DESCRIPTION OF PRIOR ART

There are known in the field frames for mounting more than one camera and allowing the photographer to hold the entire assembly in his hands. These frames allow photographs to be taken by each camera in rapid succession.

In addition, flash attachments are known which allow photographs to be taken in poor lighting conditions. These flash attachments are directly connected to an individual camera by electrical conductors which allow the flash attachment to be triggered by an electrical impulse from the camera. The electrical impulse from the camera is triggered by depressing the same switch which opens the shutter and allows the photograph to be taken. When more than one camera is placed upon a multiple camera frame, the direct connection of the flash attachment to each individual camera by wires containing electrical conductors has a disadvantage of requiring disconnection of such electrical conductors from one camera and reconnection of the conductors to the other before the same flash attachment may be triggered by the second camera.

There is no camera flash attachment switch known which allows simultaneous disconnection of the flash attachment from the first camera and reconnection of the flash attachment to the second camera.

Quite frequently photographers are required in the performance of their professional services to render multiple photographs of events in rapid succession in an area of poor lighting requiring the use of a flash attachment. Reloading one camera requires substantial time and an environment protected from exposure to light. The time required to find such a protected environment and reload the camera is substantial and taking such time might require the photographer to miss a substantial portion of any events he might be required to photograph. To eliminate the need for frequent reloading, photographers often use a frame upon which are mounted two or more cameras. In a poorly lighted environment, however, it is necessary to provide a flash attachment for each camera. To the extent that switching control of the flash attachment from the first camera to the second can be expedited, the chance of missing photograph opportunities is eliminated.

It is an object of the present invention to provide a camera flash attachment switch for simultaneously switching control of the flash attachment from the first camera to the second camera.

SUMMARY OF THE INVENTION

In accordance with the invention, the object of providing simultaneous transfer of control of the flash attachment from the first camera to the second camera is achieved by providing a switch assembly containing two buttons allowing alternative electrical connections by depressing such buttons. Upon each of the buttons appear markings allowing ready identification of the camera to which the flash attachment will then be connected. The switch assembly is then removably connected to the camera frame.

BRIEF DESCRIPTION OF THE DRAWINGS

In the drawings:
FIGS. 1A to 1D show the top, side and end views of the switch case assembly.
FIG. 2 shows an expanded view of the switch wiring.

DESCRIPTION OF THE PREFERRED EMBODIMENTS

Figure 3:
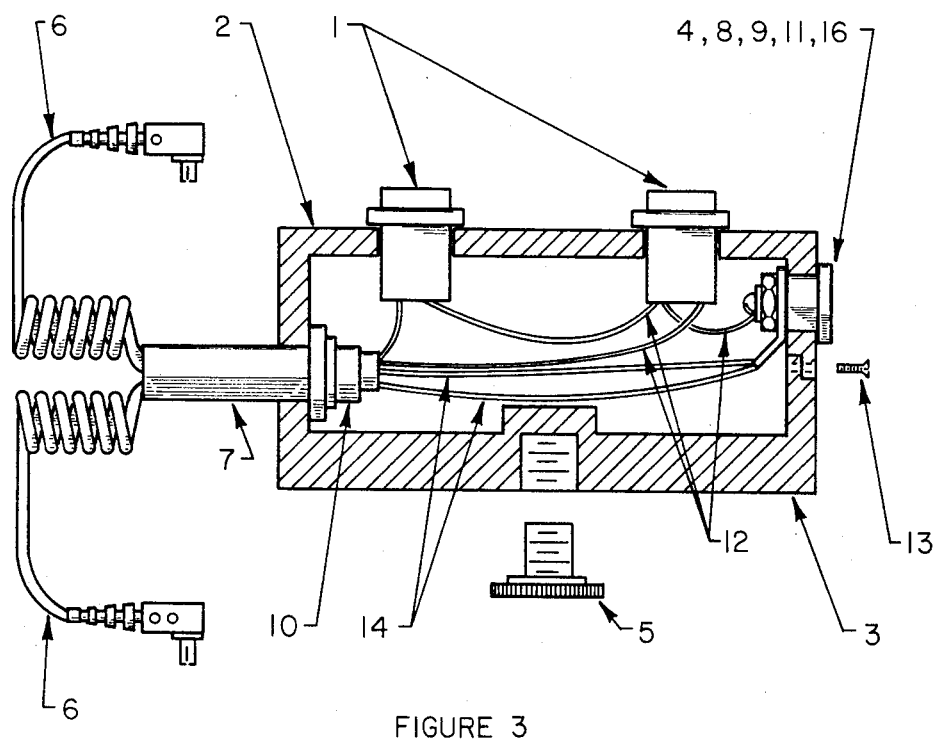
FIG. 3 shows a cross-sectional side view of the switch wiring within the switch case assembly.
Figure 4:
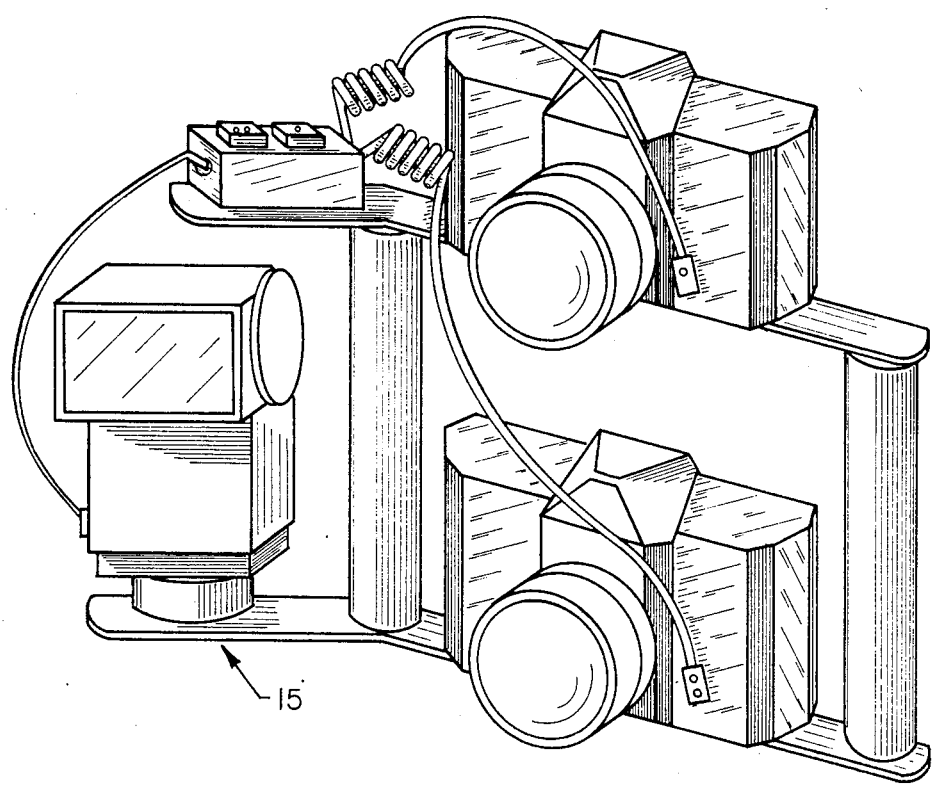
FIG. 4 shows a perspective view of the switch case assembly as mounted upon the camera frame.

The camera flash attachment switch is adapted to be attached to camera frames and other surfaces and includes a plurality of push on/push off switches 1 herein numbered two, inserted into a switch box top 2 through orifices in the switch box top 2 of sufficient dimension to allow intrusion of such switches 1. The switch box top 2 is removably connected to a switch box bottom 3 by a plurality of threaded screws 13, herein numbered two. Upon one end of the switch box top 2 and upon the corresponding end of the switch box bottom 3 there is an orifice of sufficient dimension to allow insertion therein of a grommet 7, which grommet encloses a plurality of standard synchronization cords 6 containing insulated electrical conductors, herein numbered two. The grommet 7 is compressed against the standard synchronization cords 6 by use of a metal band-type clamp 10, such that the standard synchronization cords 6 cannot be pulled through the grommet 7. Each of the standard synchronization cords 6 contains an insulated electrical conductor for positive flow 12 and an insulated electrical conductor for negative flow 14, which are hereinafter denoted the positive conductor and negative conductor, respectively. One end of the positive conductor 12 for each of the standard synchronization cords 6 is connected to one of the switches 1. One end of the negative conductor 14 for each of the standard synchronization cords 6 is connected to a metal ground plate 9. The metal ground plate 9 is connected to a standard flash synchronization fitting, negative terminal, 4. The other end of each of the standard synchronization cords 6 ends in a standard flash attachment cord plug. A positive conductor 12 is connected at one end to each of the switches 1 and at the other end to the flash synchronization fitting, positive terminal, 11. The flash synchronization fitting, negative terminal, 4 is inserted into the switch box top 2 at the opposite end from that in which is inserted the grommet 7 and is inserted through an orifice in the switch box top 2 of sufficient dimension to allow insertion of the flash synchronization fitting, negative terminal, 4, therein. The flash synchronization fitting, negative terminal, 4, is snuggly connected to the switch box top 2 and the metal ground plate 9 by a locking nut 8. The flash synchronization fittings, positive terminal 11, is attached to the flash synchronization fittings, negative terminal 4, by a standard positive plug component 16, in such manner as not to allow conduction of electricity between each terminal. The switch box bottom 3 contains an orifice or indentation in the center of its bottom of sufficient dimension and with circumferential threading of a type to allow insertion therein of a standard tripod threaded bolt 5, which standard tripod threaded bolt is utilized for mounting the switch box assembly to an appropriate holding device, herein shown as a camera frame 15.

I claim:

1. A camera flash attachment switch which comprises:
   a. A plurality of push on/push off switches;
   b. A plurality of standard synchronization cords equal in number to the number of the switches, each of which comprises:
      i. An insulated electrical conductor for positive flow hereinafter denoted positive conductor such that one end of each positive conductor is connected to the first terminal for each of the switches; and
      ii. An insulated electrical conductor for negative flow hereinafter denoted negative conductor;
   c. A flash synchronization fitting assembly which comprises:
      i. A metal ground plate to which is connected one end of each of the negative conductors;
      ii. a standard negative terminal, which is threaded at one end and removably fastened to the metal ground plate such that electrical current will flow from one to the other and having such shape and dimensions as to allow insertion therein of a standard flash attachment cord plug;
      iii. a standard positive plug component having such shape and dimensions as to allow its insertion into a standard flash attachment cord plug; and
      iii. a positive terminal, bolted to the standard negative terminal by the standard positive plug component in such a manner that electricity will flow from the positive terminal to the standard positive plug component, but will not flow from the positive terminal to the standard negative terminal;
   d. a plurality of insulated electrical conductors, hereinafter denoted secondary conductors, equal in number to the number of the switches one end of which is connected to the second terminal of one of the switches and the other end of all except one of which is connected to the second terminal of next one of the switches, while the other end of the remaining secondary conductor is connected to the positive terminals;
   e. A switch box assembly which comprises:
      i. a switch box top having a plurality of orifices equal in number to the number of the switches of sufficient dimensions as to allow intrusion therein of the switches, and having a semi-circular orifice on one end and a circular orifice on the other end of sufficient dimension as to allow intrusion therein of the flash synchronization fitting assembly; and
      ii. a switch box bottom attached to the switch box top by a plurality of screws and having a semi-circular orifice on the end corresponding to the end of the switch box top such that when the switch box top and the switch box bottom are placed together the two semi-circular orifices form one circular orifice;
   f. A locking nut removably screwed to the threaded end of the negative terminal such that the flash synchronization fitting assembly is securely fastened to the switch box through the circular assembly orifice in the switch box top;
   g. A grommet of sufficient diameter to allow intrusion therein of the standard synchronization cords and inserted through the semi-circular orifices in the switch box top and the switch top bottom;
   h. A metal band-type clamp of sufficient diameter to enclose the grommet tightly such that the standard synchronization cords cannot slip through the grommet;
   i. A plurality of standard flash attachment cord plugs for the camera and equal in number to the number of the switches and attached to the standard synchronization cords by both the positive conductor and the negative conductor.

2. A camera flash attachment switch as in claim 1 wherein the push on/push off switches number 2.

3. A camera flash attachment switch as in claim 1 wherein the switch box bottom contains an orifice or indentation in the center of its bottom of sufficient dimension and with circumferential threading of a type to allow insertion therein of a standard tripod threaded bolt.

* * * * *